US010846198B2

(12) United States Patent
Davis et al.

(10) Patent No.: US 10,846,198 B2
(45) Date of Patent: Nov. 24, 2020

(54) AUTOMATIC NAVIGATION FROM LOG STATEMENT TO CODE

(71) Applicant: Microsoft Technology Licensing, LLC, Redmond, WA (US)

(72) Inventors: Jackson Michael Davis, Carnation, WA (US); Andrew R. Sterland, Issaquah, WA (US); Patrick Fenelon, Redmond, WA (US); Esteban Herrera, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/358,442

(22) Filed: Mar. 19, 2019

(65) Prior Publication Data

US 2020/0301817 A1    Sep. 24, 2020

(51) Int. Cl.
    *G06F 11/36*    (2006.01)
    *G06F 8/75*    (2018.01)
    *G06F 8/33*    (2018.01)

(52) U.S. Cl.
    CPC ............ *G06F 11/3636* (2013.01); *G06F 8/33* (2013.01); *G06F 8/75* (2013.01)

(58) Field of Classification Search
    CPC ........... G06F 8/33; G06F 8/75; G06F 11/3636
    USPC ......................................................... 717/158
    See application file for complete search history.

(56) References Cited

U.S. PATENT DOCUMENTS

| 5,442,740 A | 8/1995 | Parikh | |
|---|---|---|---|
| 7,216,336 B1* | 5/2007 | Ezra | G06F 11/3624 714/E11.207 |
| 9,892,028 B1* | 2/2018 | Garland | G06F 11/3688 |
| 2005/0183066 A1* | 8/2005 | Jabori | G06F 11/3632 717/124 |
| 2007/0006174 A1* | 1/2007 | Sohm | G06F 11/3636 717/131 |
| 2009/0249303 A1* | 10/2009 | Duffell | G06F 11/362 717/128 |
| 2011/0154117 A1* | 6/2011 | Danielson | G06F 11/0748 714/37 |
| 2012/0311540 A1 | 12/2012 | Fanning et al. | |
| 2013/0067288 A1* | 3/2013 | Louie | G06F 11/0709 714/48 |

(Continued)

OTHER PUBLICATIONS

"International Search Report and Written Opinion Issued in PCT Application No. PCT/US2020/015983", dated May 19, 2020, 12 Pages.

*Primary Examiner* — Ryan D. Coyer
(74) *Attorney, Agent, or Firm* — Workman Nydegger

(57) ABSTRACT

Automatic navigation of a user from a log statement that is selected by the user from a log to a code expression that was executed to generate the selected log statement. The computing system automatically identifies one or more code expressions as candidates for having generated the log statement, and then maps the log statement to these identified candidate code expressions in the code. In response to input from the user selecting the log expression, the computing system uses the mapping to visually provide a correlation between the log statement and the particular code expression, where the one or more mapped code expressions includes the particular code expression that actually generated the log statement.

20 Claims, 9 Drawing Sheets

(56) References Cited

U.S. PATENT DOCUMENTS

2018/0095731 A1* 4/2018 Brown .................... G06F 9/542

* cited by examiner

```
37  2018-11-20T00:37:08.6762  App listening on port 8080
38  2018-11-20T00:37:18.8152  Getting todo
39  2018-11-20T00:37:46.2992  Creating todo Pizza
40  2018-11-20T00:37:51.5372  Creating todo Burger
41  2018-11-20T00:37:54.2762  Creating todo Burger
42  2018-11-20T00:37:55.7972  Deleting todo Sbf35507b3dc
43  2018-11-20T00:37:59.6022  Creating todo Alpha
44  2018-11-20T00:38:02.4122  Creating todo Bravo
45  2018-11-20T00:38:04.8362  Creating todo Charlie
46  2018-11-20T00:38:16.1492  Connected todo db at Newdb
47  2018-11-20T00:38:19.7032  Deleting todo Sbf35507bdd
```

~212

202 →

```
37  2018-11-20T00:37:08.6762  App listening on port 8080
38  2018-11-20T00:37:18.8152  Getting todo
39  2018-11-20T00:37:46.2992  Creating todo Pizza
40  2018-11-20T00:37:51.5372  Creating todo Burger
41  2018-11-20T00:37:54.2762  Creating todo Burger
42  2018-11-20T00:37:55.7972  Deleting todo 5bf35507b3dc
43  2018-11-20T00:37:59.6022  Creating todo Alpha
44  2018-11-20T00:38:02.4122  Creating todo Bravo
45  2018-11-20T00:38:04.8362  Creating todo Charlie
46  2018-11-20T00:38:16.1492  Connected todo db at Newdb
47  2018-11-20T00:38:19.7032  Deleting todo 5bf35507bdd
```

```
37  2018-11-20T00:37:08.6762  App listening on port 8080
38  2018-11-20T00:37:18.8152  Getting todo
39  2018-11-20T00:37:46.2992  Creating todo Pizza
40  2018-11-20T00:37:51.5372  Creating todo Burger
41  2018-11-20T00:37:54.2762  Creating todo Burger
42  2018-11-20T00:37:55.7972  Deleting todo 5bf35507b3dc
43  2018-11-20T00:37:59.6022  Creating  Goto Source Location
44  2018-11-20T00:38:02.4122  Creating
45  2018-11-20T00:38:04.8362  Creating
46  2018-11-20T00:38:16.1492  Connecte
47  2018-11-20T00:38:19.7032  Deleting todo 5bf35507baa
```

```
 ...
37  2018-11-20T00:37:08.6762  App listening on port 8080
38  2018-11-20T00:37:18.8152  Getting todo
39  2018-11-20T00:37:46.2992  Creating todo Pizza
40  2018-11-20T00:37:51.5372  Creating todo Burger
41  2018-11-20T00:37:54.2762  Creating todo Burger
42  2018-11-20T00:37:55.7972  Deleting todo 5bf35507b3dc
43  2018-11-20T00:37:59.6022  Creating todo Alpha
44  2018-11-20T00:38:02.4122  Creating todo Bravo
45  2018-11-20T00:38:04.8362  Creating todo Charlie
46  2018-11-20T00:38:16.1492  Connected to db at Newdb
47  2018-11-20T00:38:19.7032  Deleting todo 5bf35507bdd
 ...
```

213 ⟶ (bracket on lines 40–43)

202 →

222 → File1.js

...223

```
28  if(req.body.text.length >20) {
29      console.log('Failed to create item, string length
30      return;
31  }
32  console.log('Creating todo', req.body.text);      ⟵ 221
33  Todo.create({
```

...224

AUTOMATIC NAVIGATION FROM LOG STATEMENT TO CODE

BACKGROUND

Computing systems operate at the direction of computer-executable code—such as an application. It is important to find logical errors within the code in order to ensure that a computing system operates as expected when executing that code. Finding logical errors within code may be quite an intensive task, especially for complex pieces of code. Many developers use code logging as a primary diagnostic technique for finding logical errors in code. This is especially true in the cloud environment where scale makes traditional symbolic debuggers infeasible.

In code logging, a developer inserts a log-generating expression into the source code. At runtime, the execution of the log-generating expression causes the computing system to add a log statement to the log. For complicated pieces of code, there might be many log statements within the log, and thus the size of the log may be truly massive. In any case, in order to identify and fix logical errors within the code, the developer might review the log, find a log statement that represents a possible error, and then review the code that generated the log statement to see if the developer can find and correct the logical error.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to automating the process of finding a log-generating code expression (e.g., a source line) within code based on an identity of a log statement within the log. This alleviates the developer from having to find the log-generating code expression corresponding to a concerning log statement within the log. Such might be a monumental task when the code is complex, and where multiple developers have contributed to the code. While finding an individual log-generating code expression is not too difficult for a developer, doing so for the hundreds if not thousands of log statements needed for an average investigation becomes very tedious. Thus, the developer may more easily use the log to correct logical errors in the code. Furthermore, the developer may also be more apt to use the log to learn about the structure of the code itself, even if there are no logical errors to correct, since finding the code that generated particular log expressions is no longer an impediment.

In accordance with the principles described herein, a computing system may automatically navigate a user from a user-selected log statement to a particular code expression that was executed to generate the selected log statement. The computing system automatically identifies one or more log-generating code expressions as candidates for having generated the log statement, and then maps the log statement to these identified candidate code expressions in the code. In response to input from the user selecting the log expression, the computing system uses the mapping to provide a visual correlation between the log statement and the mapped code expression(s), where such code expression(s) includes the particular code expression that actually generated the log statement.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A through 2E illustrate a sequence of user interfaces that define an example user experience in which a user selects a log statement, and is automatically navigated to the code expression that generated the log statement;

FIG. 2A illustrates a user interface that represents a beginning user interface in the particular example user experience of FIG. 2A, and shows a log file populated into a log portion of the user interface;

FIG. 2B illustrates a user interface that is similar to the user interface of FIG. 2A, except that the user has now selected the log statement identified by log sequence number 43;

FIG. 2C illustrates a user interface that is similar to the user interface of FIG. 2B, except that the user has now opened a control box (e.g., by right-clicking on the selected log statement);

FIG. 2D illustrates a user interface that is similar to the user interface of FIG. 2C, except that the user has now selected the Go to Source Location control, as represented by that control now being visually emphasized;

FIG. 2E illustrates a user interface that is similar to the user interface of FIG. 2D, except that now the code portion of the user interface is now populated with a number of code expressions;

DETAILED DESCRIPTION

At least some embodiments described herein relate to automating the process of finding a log-generating code expression (e.g., a source line) within code based on an identity of a log statement within the log. This alleviates the developer from having to find the log-generating code expression corresponding to a concerning log statement within the log. Such might be a monumental task when the code is complex, and where multiple developers have contributed to the code. While finding an individual log-generating code expression is not too difficult for a developer, doing so for the hundreds if not thousands of log statements needed for an average investigation becomes very tedious. Thus, the developer may more easily use the log to correct logical errors in the code. Furthermore, the developer may also be more apt to use the log to learn about the structure of the code itself, even if there are no logical errors to correct, since finding the code that generated particular log expressions is no longer an impediment. As the terms are used herein, a "log-generating code expression" or "log expression" is a piece of code that, when executed, generates a log entry. Furthermore, a "log statement" is the log entry that was generated as a result of executing the log expression.

In accordance with the principles described herein, a computing system may automatically navigate a user from a user-selected log statement to a particular code expression that was executed to generate the selected log statement. The computing system automatically identifies one or more log-generating code expressions as candidates for having generated the log statement, and then maps the log statement to these identified candidate code expressions in the code. In response to input from the user selecting the log expression, the computing system uses the mapping to provide a visual correlation between the log statement and the mapped code expression(s), where such code expression(s) includes the particular code expression that actually generated the log statement.

Figure 1:
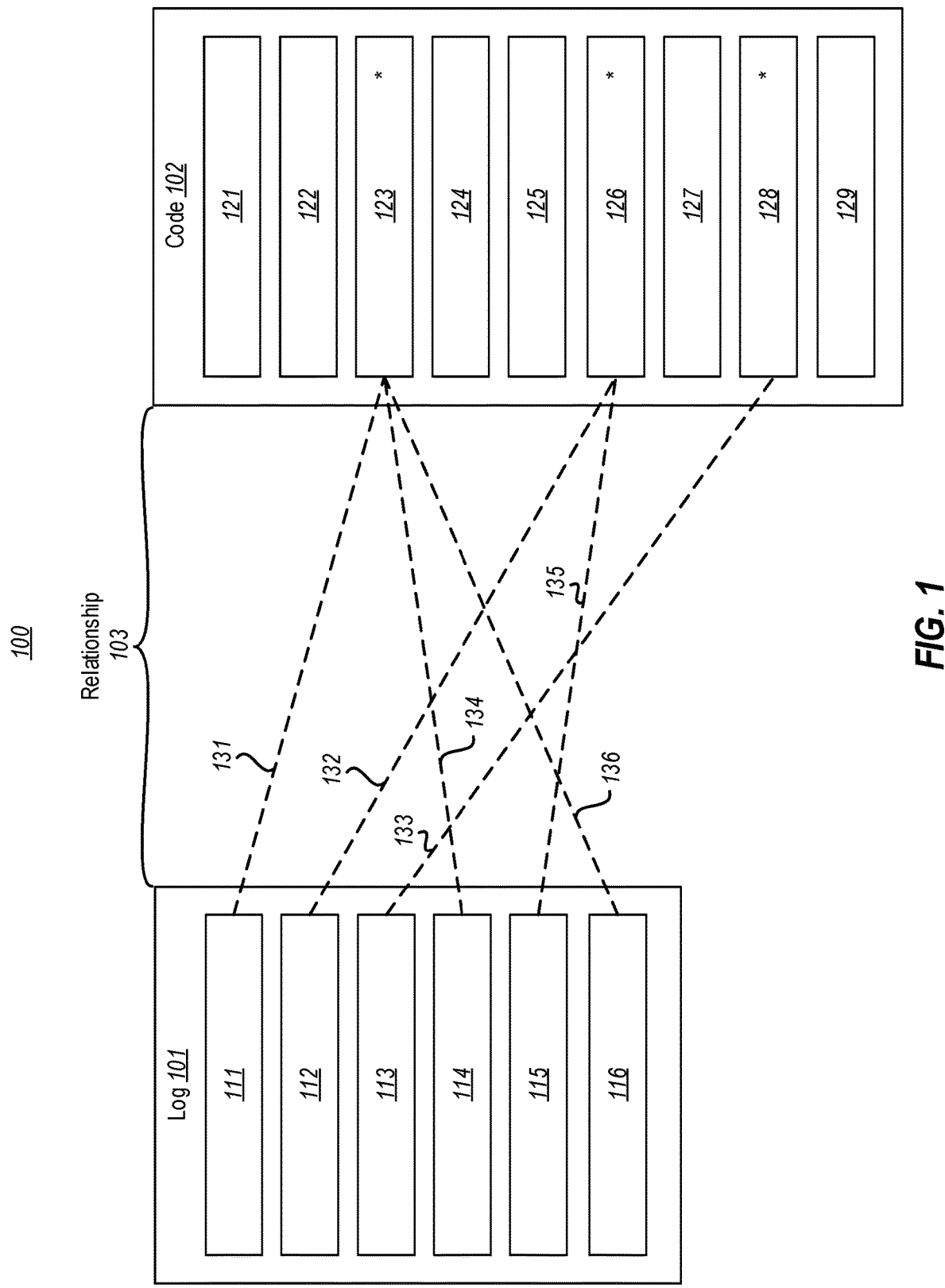
FIG. 1 illustrates an example environment that shows a relationship between a log and code, and more specifically a mapping between log-generating code expressions in the code and log statements that were generated by those log-generating code expressions.

FIG. 1 illustrates an example environment 100 that shows a relationship 103 between a log 101 and code 102. In particular, as a result of a computing system (such as the computing system 600 described below with respect to FIG. 6) (or a collection of computing systems) executing the code 102, log statements within the log 101 were generated. The principles described herein are not limited to the type of log statements included within the log 101, nor limited to the number of log statements within the log 101. The log 101 may include hundreds, thousands, or even millions of log statements. The principles described herein are also not limited to the types of code 102 that generated log statements within the log 101. As an example only, the code 102 may be a web site or a web service. The code 102 may be simple, or complex, and may represent thousands or even millions of lines of code.

That said, for purposes of example only, the log 101 and the code 102 in FIG. 1 is kept quite short and simple for illustration purposes only. For instance, the log 101 is illustrated as including a number of log statements represented by rectangles, including log statements 111, 112, 113, 114, 115 and 116. The code 102 includes various code expressions that may be executed by a computing system. The code expressions are also represented as rectangles, and in this example includes code expressions 121 through 129. Some of those code expressions, when executed, cause a log statement to be generated and thus may also be referred to herein as "log-generating code expressions". As an example, log-generating code expressions 123, 126 and 128, when executed, generate log statements. These log-generating code expressions have an asterisk on their right side to represent that these code expressions, when executed, generate log statements. On the other hand, code expressions 121, 122, 124, 125, 127 and 129 represent other parts of the code. Log-generating code expressions typically constitute just a small fraction of the totality of code expressions within code.

For instance, one execution of the code expression 123 caused log statement 111 to be generated (as represented by line 131); another execution of the code expression 123 caused another log statement 114 to be generated (as represented by line 134); and yet another execution of the code expression 123 caused yet another log statement 116 to be generated (as represented by line 136). Furthermore, one execution of the code expression 126 caused log statement 112 to be generated (as represented by line 132), and another execution of the code expression 126 caused another log statement 115 to be generated (as represented by line 135). Finally, in this example, one execution of the code expression 128 caused log statement 113 to be generated (as represented by line 133).

When evaluating the log 101, a developer may not know the relationship 103 between log statements and code expressions, and thus may not know which code expression caused which log statement to be generated. Such would greatly assist in understanding and evaluating the operation of the code 102, and finding and fixing logical errors within the code 102. The principles described herein assist the developer by automatically finding the relationship for a given log statement that the developer is interested in. This is especially helpful where multiple developers might have inserted log-generating code expressions, or where the code is complex, since the developer will not be aware of the totality of such code expressions within the code.

The example environment 100 of FIG. 1 will be frequently referred to hereinafter. But first, an example sequence of user interfaces collectively representing an example user experience will be described with respect to FIGS. 2A through 2E, which collectively represent an example user experience that takes advantage of an automated mechanism for determining an association between a log statement (or each of multiple log statements) and a corresponding log-generating code expression that generated that log statement. Thereafter, FIGS. 3 through 5 will be used to describe a mechanism for how the relationships between log statements and code expressions may be found.

FIG. 2A illustrates a user interface 200A that represents a beginning user interface in a sequence of user interfaces that constitute a particular example user experience 200, though the principles described herein do not preclude other user interfaces being displayed prior to the user interface 200A. Each user interface of the example user experience 200 includes a log portion 201 for displaying various log statements of a log, and a code portion 202 for displaying various code expressions. In the beginning user interface 200A in the user experience 200, there are no code expressions included within the code portion 202 of the user interface 200A. However, there is a log loaded, and thus various log statements are shown as populated within the log portion 201. In particular, log statements having log sequence numbers 37 through 47 are illustrated, with the ellipses 211 and 212 representing that this may be only a portion of the log statements, and the log portion 201 may be scrollable or otherwise vertically navigable to go to different portions of the log.

Figure 2D:
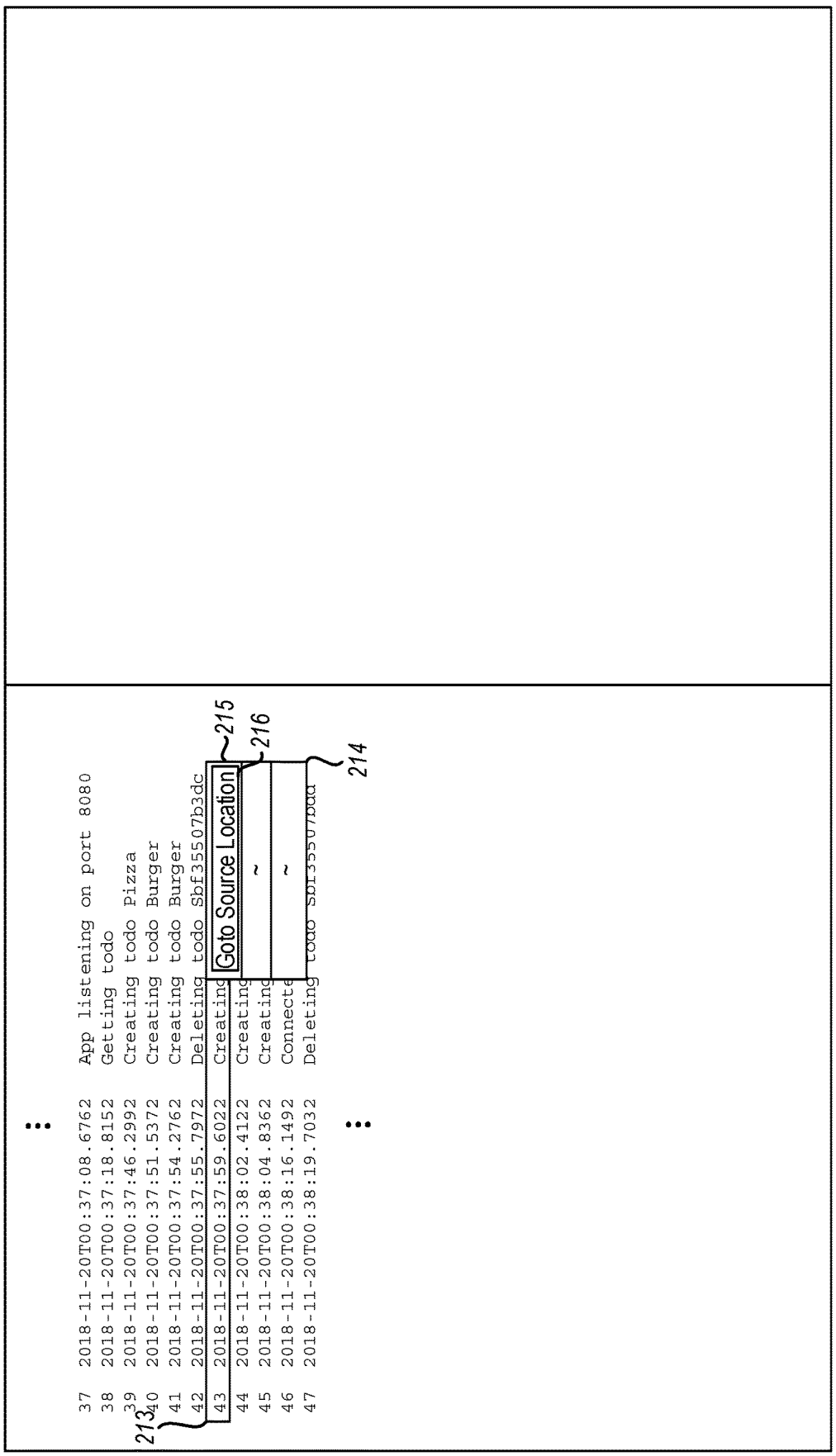

FIG. 2B illustrates a user interface 200B that is similar to the user interface 200A of FIG. 2A, except that the user has now selected the log statement identified by log sequence number 43. Thus, that log statement is now visually emphasized as contained within box 213. As an example, that log statement may be highlighted. The selected log statement of FIGS. 2B through 2E may also be referred to herein as the "selected log statement 213".

FIG. 2C illustrates a user interface 200C that is similar to the user interface 200B of FIG. 2B, except that the user has now opened a control box 214 (e.g., by right-clicking on the selected log statement 213). The control box 214 has a number of controls, the most relevant being the "Go to Source Location" control 215 at the top of the control box 214.

FIG. 2D illustrates a user interface 200D that is similar to the user interface 200C of FIG. 2C, except that the user has now selected the Go to Source Location control 215, as represented by that control now being visually emphasized (e.g., by box 216). For instance, the Go to Source Location control 215 might now be highlighted.

FIG. 2E illustrates a user interface 200E that is similar to the user interface 200D of FIG. 2D, except that now the code portion 202 of the user interface 200E is now populated with a number of code expressions. Furthermore, the code expression 221 is now visually emphasized (e.g., highlighted), which represents the user that the code expression 221 is a log-generating code expression that may have generated (or did generate) the selected log statement that remains visually emphasized in the log portion 201. An upper portion 222 of the code portion 202 shows the code file "File1.js" of the code that is now displayed within the code portion 202. The ellipses 223 and 224 represent that the code expressions within the code portion 202 may be only a portion of the code expressions of the code file designated in field 222, and the code portion 202 may be scrollable or otherwise vertically navigable to go to different portions of the code file.

The log statements within the log portion 201 may be collectively generated by collections of code files (e.g., a project) one file of which being File1.js. Optionally, the user may then edit the code displayed within the code portion 202. This user experience may be repeated for any number of log statements. Thus, the user may review the portion of the code that generated one or more log statements (e.g., the context of the relevant log-generating code expression(s)) in order to evaluate and understand the operations of the code, and perhaps also to find and fix logical errors in the code.

Figure 3:
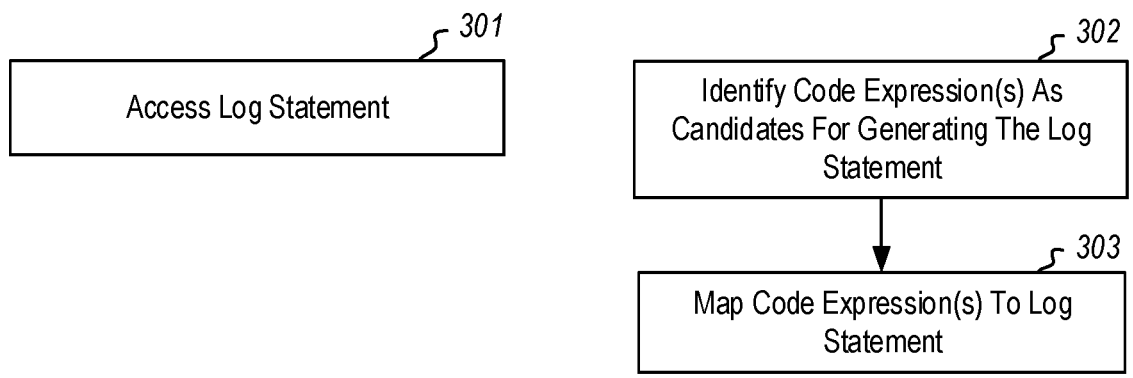
FIG. 3 illustrates a flowchart of a method for automatically navigating a user from a log statement that is selected by the user to a code expression that was executed to generate the selected log statement, in accordance with the principles described herein.

FIG. 3 illustrates a flowchart of a method 300 for automatically navigating a user from a log statement that is selected by the user to a code expression that was executed to generate the selected log statement, in accordance with the principles described herein. As the method 300 may be performed in order to automatically navigate a user from any of the log statements 111 through 116 of FIG. 1 to their corresponding code expression 121 through 123 in FIG. 1, and in order to allow for the example user experience 200 of FIGS. 2A through 2E, the method 300 of FIG. 3 will now be described with frequent reference to FIGS. 1 through 3.

The method 300 may be performed by a computing system, such as a computing system 600 described below with respect to FIG. 6. This computing system may be the same computing system as, or may be a different computing system than, the computing system that executes the code expression to generate the log statement. The method 300 may be performed once for each of at least some of the log statements.

The method 300 includes accessing a log statement that was generated by a computing system executing a particular log-generating code expression within code (act 301). Referring to FIG. 1, if the selected log statement was log statement 111, then the log-generating code expression would be code expression 123; if the selected log statement was log statement 112, then the log-generating code expression would be code expression 126; if the selected log statement was log statement 113, then the log-generating code expression would be code expression 128, and so forth as indicated by relationships 103. In the example user experience 200 of FIGS. 2A through 2E, the log statement corresponds to log sequence identifier 43 (bound by box 213 in FIGS. 2B through 2E), and the code expression is that bound by box 221 in FIG. 2E.

In addition, the method 300 includes identifying one or more code expressions as candidates for having generated the log statement (act 302). This identification may be performed by, for instance, determining (e.g., generating or accessing) a regular expression for each of at least some of the log-generating code expressions that are within the code. Such a regular expression defines the lexicography of the code expression. The construction of these regular expressions may be performed by first finding all of the log-generating code expressions in the code. Then, the regular expression is constructed for each log-generating code statement. As an example, using the parameters passed to a given log-generating code statement, a regular expression is constructed that accounts for string concatenation and variable replacement.

Referring to FIG. 1, a regular expression may be generated for each of the log-generating code expressions 123, 126 and 128, or perhaps only some of those log-generating code expressions. Then, the log statement may be analyzed against each regular expression to identify any matching regular expressions. For each of those one or more regular expressions that match, the corresponding log-generating code expression is identified as a candidate code expression for having generated the log statement.

For instance, in the example user experience 200 of FIGS. 2A through 2E, the selected log statement 213 is "Creating todo Alpha". The regular expression associated with line 32 in File1.js (highlighted by box 221 in FIG. 2E) would be/Creating todo {w} */. That is, the regular expression is the literal "Creating todo" followed by a string of any number of any characters. The selected log statement 213 matches this regular expression, and thus the code segment 221 is seen as a candidate for having generated the selected log statement 213.

Of course, it is possible that matches to regular expressions may occur without the respective code expression having actually generated the log statement. For instance, other log statements (such as "Creating todo Burger") also match this regular expression. Referring to FIG. 1, the log statement 111 might match regular expressions for the actual code expression 123 that generated the log statement, as well as potentially one or more other log-generating code expressions (e.g., code expression 128) that did not generate the selected log statement 111. Nevertheless, the candidate set of code expressions may be very much smaller than the total set of log-generating code expressions. Thus, the matching log-generating code expressions are a manageable set of candidates for having generated the log statement.

In one embodiment, if there are multiple matching log-generating code expressions, the candidate code expressions may be reduced or prioritized by assigning a match score to each of the candidate log-generating code expressions. For instance, this may be based on the degree of lexicographic match between the selected log statement and each candidate code expression. As an example, if there are multiple matches, the user may be presented with each of the matching log-generating code expressions ordered in descending order by match score. The user might navigate from one matching log-generating code expression to another, or may be shown the top predetermined number of matching code expressions. The developer may then use his or her knowledge to more easily find the actual code expression that generated the selected log statement.

Upon identifying one or more code expressions as candidates for having generated the log statement (act 302), the candidate code expressions are mapped to the log statement (act 303). The acts 302 and 303 are shown in parallel with act 301. This is done simply to represent that in the broadest principles described herein, the identification and mapping of the candidate log statements for a particular log statement is not temporally dependent upon the accessing of a particular log statement (which may occur when the user selects that log statement).

For instance, in what is referred to herein as the "pre-generated mapping" embodiment, the identification (act 302) and mapping (act 303) may be performed for each of multiple log statements prior (and perhaps days, weeks, or years before) a user actually selects one of those log statements. As an example, the identification and mapping might occur the instant that (or very shortly after) a new log statement is generated. This has the advantage of reducing latency between the time that the user selects a log statement until the time that the corresponding log-generating code expression is shown.

On the other hand, in what is referred to herein as an "on-demand mapping" embodiment, the identification (act 302) and mapping (act 303) for a given log statement may be deferred until after the user selects that log statement. This preserves the processing associated with method 300 by limiting the number of times that method 300 is performed. A combination of the pre-generated mapping and on-demand mapping embodiments may be performed, where for some log statements (e.g., perhaps those that the user is relatively more likely to select), the mapping is prepared prior to a user selecting that log statement; and for other log statements (e.g., perhaps those that the user is relatively less likely to select), the mapping is deferred until the user selects the log statement.

Figure 4:
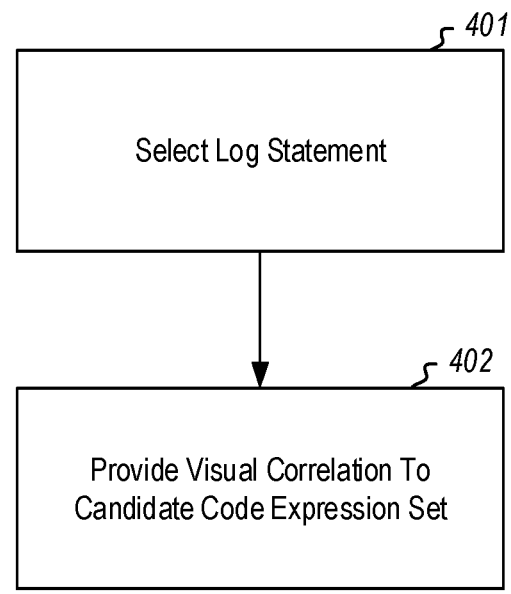
FIG. 4 illustrates a flowchart of a method for navigating a user to a code expression in accordance with the principles described herein.

FIG. 4 illustrates a flowchart of a method 400 for navigating a user to a code expression in accordance with the principles described herein. The method 400 may be performed by a computing system, such as the computing system 600 described below with respect to FIG. 6. This computing system may be the same as, or different than, the computing system that executed the code to generate log statements in the log, or the computing system that performed method 300.

The method 400 is initiated upon the user selecting a log statement from the log (act 401). For instance, referring to FIG. 1, the user might select log statement 111 from the log 101. As a more specific example, referring to FIG. 2B, the user might select the log statement 213 from the log portion 201 of the user interface 200B. This may result in the act of accessing a log statement (act 301) of FIG. 3 being performed. In response, the computing system uses the corresponding mapping to visually provide to the user a correlation between the selected log statement and the candidate code expression(s) that may have generated the selected log expression (act 402). That candidate code expression(s) set will include that actual log-generating code expression that, when executed, generated the selected log statement, amongst potentially other false matches. In the case of the example user experience 200, FIG. 2E shows the correlation by having both the selected log statement 213, and the corresponding code expression 221 being highlighted.

In the illustrated embodiment, the matching log-generating code expressions are shown as a line of code (e.g., see FIG. 2E). However, the principles described herein may also map to portions of the log expression. For instance, consider the example user experience 200, where the selected log expression 213 is "Creating todo Alpha". This log statement 213 was matched against the regular expression/Creating todo {w} */ of the log-generating code expression 221 to determine that the log-generating code expression 221 was a match.

The matching could also be used to determine that the actual string matching to a portion of the regular expression {w}* was "Alpha". Thus, the "Creating todo" portion of the log statement maps to the literal "Creating todo" of the regular expression, and the "Alpha" portion of the log statement maps to the portion {w} * of the regular expression. This further mapping of portions of the log statement to portions of the log-generating code expression may be also visually emphasized to the user. For instance, upon hovering a pointer over the "req.body.text" or "text" portion (i.e., the data used to construct the "Alpha" portion of the selected log statement) of the matching code expression 221, the user interface 200E of FIG. 2E might actually show the text Alpha in close proximity or in a manner that visually correlates "req.body.text" and "Alpha".

Figure 5:
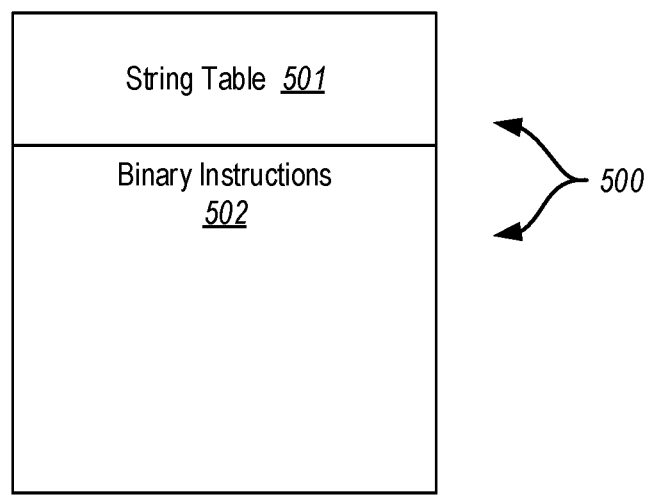
FIG. 5 illustrates compiled binary of a C # file, which includes a string table that includes all of the literals that are referenced in the corresponding source code, as well as the binary instructions that represent the program.

In the example user experience 200, the regular expressions are matched against log-generating code statements that are expressed in source code (e.g., Javascript). However, the regular expressions may also be used to match against string literals expressed in a string table of compiled binary. For instance, FIG. 5 illustrates compiled binary file 500 of a C # file, which includes a string table 501 that includes all of the literals (e.g., "Creating todo", "Deleting todo", etc.) that are referenced in the corresponding source code. The compiled binary 500 also includes the binary instructions 502 that represent the machine-executable binary instructions corresponding to the source code.

Each of the strings in the string table 501 may have a regular expression. Those regular expressions may be matched against a selected log statement to determine one or more matching string literals. For each matching literal string within the string table 501, the binary instructions that load that literal may be found. Then, a symbol file (generated during the compilation) may be used to find the actual candidate code expression within the source code. This will likely be where the literal was expressed in a declaration, but dataflow analysis may be employed to find where that declared literal is found in actual log-generating code expressions as well. Thus, the mapping between log expression types and code expressions may occur at compile time or run time as well.

Thus, the principles described herein greatly assist a developer in finding code expressions that generate log statements of interest, to thereby assist the developer in understanding the operation of the code, as well as potentially fixing logical errors in the code. As the principles described herein may operate in the context of a computing system, a computing system will now be described with respect to FIG. 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
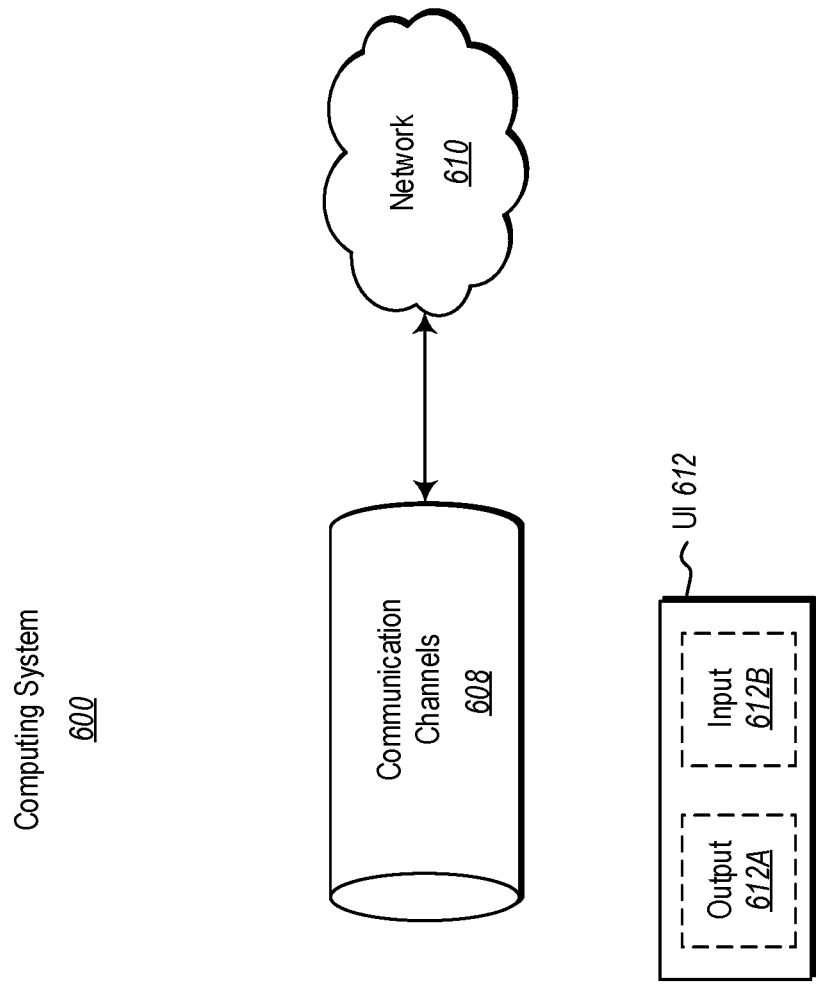
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries. On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within the peer-to-peer system to then take action based on the authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to automatically navigate a user from a selected log statement to a corresponding code expression that generated the selected log statement, said computing system comprising:
   one or more processors; and
   one or more computer-readable hardware storage devices storing computer-executable instructions that are executable by the one or more processors to cause the computing system to at least:
   display, within a user interface, a log comprising a log statement, wherein the log statement was generated during execution of a particular log-generating code expression;
   identify one or more candidate log-generating code expressions as candidates that potentially generated the log statement, said particular log-generating code expression being included among the one or more candidate log-generating code expressions;
   generate a map that associates the log statement with the one or more candidate log-generating code expressions; and
   in response to input selecting the statement from within the user interface, use the map to visually provide correlation between the log statement and the particular log-generating code expression.

2. The computing system in accordance with claim 1, wherein the map also associates one or more portions of the log statement with one or more portions of the particular log-generating code expression, and wherein execution of the computer-executable instructions further causes the computing system to:

use the map to visually provide a specific correlation between at least one portion of the log statement and a corresponding portion of the particular log-generating code expression.

3. The computing system in accordance with claim 2, the corresponding portion of the particular log-generating code expression representing data used to construct the at least one portion of the log statement.

4. The computing system in accordance with claim 1, wherein the map also associates one or more portions of the log statement with one or more portions of the particular log-generating code expression, and wherein execution of the computer-executable instructions further causes the computing system to:
   use the map to visually provide a specific correlation between each of a plurality of portions of the log statement and corresponding portions of the particular log-generating code expression.

5. The computing system in accordance with claim 1, wherein the particular log-generating code expression is included within source code that includes a plurality of log-generating code expressions, and wherein identifying of the one or more candidate log-generating code expressions as candidates includes:
   determining a lexicography for each of at least some of the plurality of log-generating code expressions of the source code; and
   determining that a particular lexicography of the particular log-generating code expression matches a lexicography of the log statement.

6. The computing system in accordance with claim 5, wherein
   identifying the one or more candidate log-generating code expressions includes prioritizing the one or more candidate log-generating code expressions.

7. A method for automatically navigating a user from a log statement that is selected by the user to a code expression that was executed to generate the selected log statement, the method comprising:
   displaying, within a user interface, a log comprising a log statement, wherein the log statement was generated during execution of a particular log-generating code expression;
   identifying one or more candidate log-generating code expressions as candidates that potentially generated the log statement, said particular log-generating code expression being included among the one or more candidate log-generating code expressions;
   mapping the log statement to the one or more candidate log-generating code expressions; and
   in response to input selecting the log statement from within the user interface, use the mapping to visually provide a correlation between the log statement and the particular log-generating code expression.

8. The method in accordance with claim 7, the mapping occurring after execution of source code comprising the particular log-generating code expression.

9. The method in accordance with claim 7, the mapping occurring during executing of source code comprising the particular log-generating code expression.

10. The method in accordance with claim 7, the mapping occurring prior to execution of source code comprising the particular log-generating code expression.

11. The method in accordance with claim 7, wherein the particular log-generating code expression is a code line.

12. The method in accordance with claim 7, the mapping also mapping one or more portions of the log statement to one or more portions of the particular log-generating code expression, the method further comprising:
   using the mapping to visually provide a specific correlation between at least one portion of the log statement and a corresponding portion of the particular log-generating code expression.

13. The method in accordance with claim 12, the corresponding portion of the particular log-generating code expression representing data used to construct the at least one portion of the log statement.

14. The method in accordance with claim 7, the mapping also mapping one or more portions of the log statement to one or more portions of the particular log-generating code expression, the method further comprising:
   using the mapping to visually provide a specific correlation between each of a plurality of portions of the log statement and corresponding portions of the particular log-generating code expression.

15. The method in accordance with claim 7, wherein the particular log-generating code expression is included in compiled code.

16. The method in accordance with claim 7, wherein the particular log-generating code expression is included in source code.

17. The method in accordance with claim 16, the source code comprising a plurality of log-generating code expressions, and wherein identifying the one or more candidate log-generating code expressions comprises:
   determining a regular expression for each of at least some of the plurality of log-generating code expressions of the source code; and
   analyzing if the log statement matches any one of the regular expressions, and if there is a match, determining that the respective matching log-generating code expression is a candidate for having generated the log statement.

18. The method in accordance with claim 17, wherein if there are multiple candidate log-generating code expressions identified as candidates for having generated the log statement, the method further comprising reducing or prioritizing the multiple candidate log-generating code expressions by assigning a match score to each one of the multiple candidate log-generating code expressions.

19. The method in accordance with claim 7, the identifying of the one or more candidate log-generating code expressions comprises:
   evaluating a compiled version of code comprising the one or more candidate log-generating code expressions to find matching portions in the compiled code; and
   finding source code that corresponds to the matched portions of the compiled code.

20. One or more hardware storage devices that store computer-executable instructions that are structured such that, when executed by executable by one or more processors of a centralized identity system to cause the centralized identity system to automatically navigate a user from a log statement that is selected by the user to a code expression that was executed to generate the selected log statement, by causing the centralized identity system to at least:
   access a log statement that was generated by a computing system executing a particular log-generating code expression within code;
   identify one or more candidate log-generating code expressions as candidates that potentially generated the log statement, said particular log-generating code expression being included among the one or more candidate log-generating code expressions;

map the log statement to the one or more candidate log-generating code expressions; and in response to input selecting the log statement, use the mapping to visually provide a correlation between the log statement and the particular log-generating code expression.

\* \* \* \* \*